United States Patent
Cudahy (10) Patent No.: US 9,005,537 B1
(45) Date of Patent: Apr. 14, 2015

(54) CONTINUOUS FLOW, HIGH CAPACITY SYSTEM FOR RAPIDLY CONVERTING THE COMBINATION NATURAL GAS AND COAL TO LIQUID FUELS

(71) Applicant: George Francis Cudahy, Anthony, NM (US)

(72) Inventor: George Francis Cudahy, Anthony, NM (US)

(*) Notice: Subject to any disclaimer, the term of this patent is extended or adjusted under 35 U.S.C. 154(b) by 0 days.

(21) Appl. No.: 14/205,177

(22) Filed: Mar. 11, 2014

Related U.S. Application Data (60) Provisional application No. 61/804,178, filed on Mar. 21, 2013.

(51) Int. Cl.
*B01J 3/02* (2006.01)
*C10G 1/06* (2006.01)
*B01J 19/00* (2006.01)
*B01J 19/20* (2006.01)

(52) U.S. Cl.
CPC ........ *B01J 3/02* (2013.01); *B01J 19/004* (2013.01); *B01J 19/20* (2013.01); *C10G 1/06* (2013.01)

(58) Field of Classification Search
CPC ............ C10G 1/06; C10G 1/065; C10B 7/10; C10B 47/44; C10B 47/18; C10B 49/04; C10B 53/04
See application file for complete search history.

(56) References Cited

U.S. PATENT DOCUMENTS 2,913,388 A * 11/1959 Howell et al. ............... 208/415
4,316,873 A * 2/1982 Koch .......................... 422/112
4,483,257 A * 11/1984 den Otter .................... 110/218

* cited by examiner

*Primary Examiner* — Lessanework Seifu
(74) *Attorney, Agent, or Firm* — Buskop Law Group, PC; Wendy Buskop (57) ABSTRACT

A continuous high capacity system for converting a combination of natural gas and coal into liquid fuel, using a pug for blending less than 200 micron diameter particulate with a plasticizing agent; a sealing auger for forming an agglomerated material and sealing, a cutting device, a vacuum chamber to remove air from the cut material, a second sealing auger for forming a de-aerated agglomerated material and sealing, a second cutting device, a gas injection chamber for impregnating the de-aerated cut material with natural gas, an extruder forming an extrudate, a heating chamber to evolve at least one gas; a pressure sensor and temperature sensors in the heating chamber, a cooling chamber providing controlled pressure and controlled temperature cooling of the evolved gasses, wherein the cooling chamber liquefies sequentially at least 50 percent of the evolved gasses forming a liquid.

13 Claims, 7 Drawing Sheets

CONTINUOUS FLOW, HIGH CAPACITY SYSTEM FOR RAPIDLY CONVERTING THE COMBINATION NATURAL GAS AND COAL TO LIQUID FUELS

CROSS REFERENCE TO RELATED APPLICATION

The present application claims priority to and the benefit of U.S. Provisional Patent Application Ser. No. 61/804,178 filed on Mar. 21, 2013, entitled "CONTINUOUS FLOW, HIGH CAPACITY SYSTEM FOR RAPIDLY CONVERTING THE COMBINATION NATURAL GAS AND COAL TO LIQUID FUELS." This reference is hereby incorporated in its entirety.

FIELD

The present embodiments generally relate to a continuous flow, high capacity system for rapidly converting the combination of natural gas and coal, and natural gas and other carbonaceous materials to liquid fuels.

BACKGROUND

The efficient production of liquid fuels from the combination of natural gas and coal would reduce dependence on oil and would reduce the overall cost of transportation of energy.

In addition, the pollutants, such as heavy metals and sulfur, contained in coal can be more readily removed from a liquid fuel produced from the mixture of natural gas and coal prior to its being combusted for energy.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a continuous flow, high capacity system for rapidly converting coal and other carbonaceous materials, when mixed with natural gas and other high hydrogen fluids, to liquid fuels by rapidly heating the mixture of carbonaceous materials and high hydrogen fluids to form hydrocarbon gasses and then converting those gasses into liquids by controlled cooling of the gasses.

Implementation of this invention would produce liquid fuels which would cost one-half the cost of present liquid fuels per equivalent energy content. Using the cost of crude oil at $100 per barrel which equates to $17.15 per MMBtu (MMBtu=decatherm=one million btu), the cost of coal at $3.00 per MMBtu and natural gas at $5.00 per MMBtu, the cost of the coal and natural gas input to the process is one-fifth of the equivalent energy cost of crude oil. Since the weight of the natural gas required is approximately 12 percent of the total weight, not accounting for the methane already contained in the coal input into the process, and the weight of the coal input into the process is approximately 88 percent of the total weight the input cost per MMBtu is $3.44 based on the energy content by weight of each element. Using an 80 percent efficiency for the conversion process and selling the produced liquid fuel at two times the cost of the recovered energy content would yield a liquid fuel cost of approximately $8.60 per MMBtu. Significant implementation of this invention would yield a positive economic benefit because of the reduced cost of energy to the economy.

Implementation of this invention would allow the removal of heavy metals and other pollutants, such as sulfur, from the liquid fuel so produced prior to burning the fuel, whereas the burning of coal requires the removal of these pollutants after the coal is burned. The after burn removal of pollutants is an expensive undertaking, whereas the removal of these pollutants from the liquid fuel is less expensive and can achieve a more thorough cleaning of the fuel as is achieved in liquid fuel cleaning today.

Since the United States has abundant reserves of both natural gas and coal, the implementation of this invention would reduce, if not eliminate, the requirement for the importation of energy in the form of liquid fuel, thus potentially making the United States energy independent.

Implementation of this invention at, or in close proximity to, the coal mines would eliminate the railroad transportation of the coal for the fuel so produced from the coal. The liquid fuel could be transported to the location of refining or use via pipeline.

The continuous, high capacity system for converting coal and other carbonaceous materials in combination with natural gas and other high hydrogen fluids into liquid and gaseous hydrocarbon fuels, uses a pug for blending less than 200 micron diameter carbonaceous particulate in the pug with a plasticizing agent; a sealing auger for forming an agglomerated plasticized material and sealing, a cutting device for shredding the agglomerated material; a vacuum chamber to remove air from the shredded agglomerated material; a second sealing auger for agglomerating the de-aerated material and sealing, a second cutting device for shredding the agglomerated material, a second chamber for injecting natural gas and other high hydrogen content fluids into the shredded de-aerated material, an extruder forming an extrudate; a heating chamber to evolve at least one gas from the extrudate; a pressure sensor and temperature sensors in the heating chamber, a cooling chamber providing controlled pressure and controlled temperature cooling of the at least one evolved gas, wherein the cooling chamber liquefies sequentially at least 50 percent of the at least one evolved gas forming a liquid, cooling chamber temperature sensors and pressure sensor, a pressure sealing controllable particle port with valve, liquid ports, a pressure regulator valve and monitors for temperature and pressure.

The heating chamber can be a reaction chamber that isolates the mixed material from ambient temperatures and pressures and undesired gasses. In embodiments, the heating chamber can be an insulated steel reaction vessel, adapted to support pressure ranges without deforming or exploding, notably of pressures up to 500 psi without deforming.

In other embodiments, a heat exchanger can be used instead of the heating chamber. The heat exchanger can have heat exchanger tubes surrounded by a heat exchanger duct. The heat exchanger duct can carry high temperature fluid over and around the exterior of the heat exchanger tubes, which can contain extrudate and then gas inside.

The cooling chamber can range in length in an embodiment to allow sufficient temperature variations along the cooling chamber for a given desired flow rate in order to separate the liquid fuels according to their particular condensing temperatures.

The cooling chamber can range in length based on the preset temperatures desired by the user. A longer cooling chamber can allow up to 100 tons per hour of the combination of the carbonaceous materials and high hydrogen fluids to be processed, a shorter cooling chamber can only allow about one ton an hour of a combination of carbonaceous material and high hydrogen fluids to be processed.

The current monitoring device for the extruder motor can be an ammeter. The ammeter consists of a transformer around one of the extruder motor leads. The transformer then provides a signal to a meter or executive dashboard that presents the amperage of the motor.

To operate the system, the coal and/or carbonaceous material is first converted to a fine size.

The coal and/or carbonaceous material are then mixed with liquid hydrocarbon and/or water or any plasticizing agent to cause the coal and/or carbonaceous material to behave in a plastic or quasiplastic manner. The carbonaceous material and plasticizing agent combination must be able to be extruded using sealing augers, an extrusion auger, or similar devices, and, at the same time be able to maintain an air/gas seal across each auger.

In order to remove all or almost all air contained in the plasticized carbonaceous material, the plasticized material is extruded into a vacuum chamber via a sealing auger, where a high vacuum exists, which vacuum removes all or almost all of the air contained in the plasticized carbonaceous material while the material is in the vacuum chamber. The vacuum is maintained in the vacuum chamber via an external vacuum pump in conjunction with sealing the vacuum chamber from ambient air by the sealing auger and the second chamber sealing auger being filled or nearly filled with the plasticized material, plus any shafts entering the vacuum chamber having appropriate seals. A shredding knife can be used on the carbonaceous material as it exits the vacuum chamber sealing auger to reduce the size of the agglomerated material in order to facilitate the removal of air from the plasticized material by the vacuum present in the chamber.

After suitable time in the vacuum chamber to remove all, or almost all, of the entrained air in the shredded particles, the de-aerated particles are then extruded, using a second sealing auger, into a natural gas and/or high hydrogen gas injection chamber. A shredding knife can be used on the de-aerated carbonaceous material as it exits the gas injection chamber sealing auger to reduce the size of the agglomerated material in order to facilitate the entrainment of the high hydrogen gas into the plasticized material by the high pressure gas present in the chamber.

After a suitable time in the gas injection chamber to entrain the desired amount of high hydrogen content gas into the plasticized particles, an extruding auger agglomerates the gas impregnated carbonaceous plasticized material forming a gas impregnated extrudate.

The extruding auger extrudes the gas impregnated extrudate into a heating chamber.

If air contained in the particles, prior to any potential air removal in the vacuum chamber, does not excessively interfere with the conversion process herein described, if there is no air removal via a vacuum chamber, then the plasticized particles can be directly extruded into a gas injection chamber followed by extrusion into a heating chamber without first going through a vacuum chamber.

In order to raise the pressure of the plasticized material during the extrusion process a compression cap which reduces the area into which the gas impregnated extrudate is extruded prior to entering the heating chamber is usually added. This causes the extrudate to be of a higher pressure than the heating chamber and/or heat exchanger pressure which facilitates the expanding and breaking up of the particles upon entering the heating chamber and/or heat exchanger.

Upon extrusion into the heating chamber, the heating chamber can directly heat the extrudate to change the carbonaceous material-gas mix in the extrudate into a gas or almost all into a gas. In another embodiment, the extrudate can be heated indirectly via heat exchangers to change the carbonaceous material-gas mix in the extrudate into a gas or almost all into a gas. The mix can be heated directly by introduction of an oxidizing agent into the heating chamber thus oxidizing some of the carbon and/or hydrogen contained in the material to cause the particles to be rapidly heated, causing transformation of all or almost all of the particles into a gas. Other type heaters, such as electric heaters, may also be used to heat the particles. The particles can also be heated by injecting high temperature steam, or other high temperature products, into the heating chamber.

The hydrocarbon material can also be rapidly heated indirectly by extruding the extrudate into or around a heat exchanger whereby external heat is applied to the heat exchanger which, in turn, applies the heat to the particles causing the rapid increase in the temperature of the material, thus changing all or almost all of the material to gasses.

The heating chamber is maintained at the desired temperature to which the hydrocarbon material is to be subjected so that the material is quickly raised to the desired temperature in the heating chamber.

Any liquids or solids which are not converted into a gaseous state in the heating chamber or heat exchanger are collected at the bottom of the exit of the heating chamber or bottom of the entrance to the cooling chamber, or in between.

In order to change the gaseous hydrocarbon to a liquid state, or combination of liquid and gas, the gaseous hydrocarbon produced by the heating chamber is next introduced into a cooling chamber whereby the gaseous hydrocarbon is changed, via temperature regulation, or temperature and pressure regulation, to various liquid or gaseous fuels and hydrocarbons.

Additional hydrogen can be introduced into the heating chamber to increase the amount of hydrogen contained in the fuel/hydrocarbon to be produced by injecting high hydrogen content products, such as methane, liquid water, or steam at or above the heating chamber pressure in the amount required to produce the desired hydrocarbon products. If water, either gaseous or liquid, is used to supply additional hydrogen to the evolved gasses, the oxygen in the water will react with some of the carbon in the evolved gasses thus reducing the amount of carbon available in the evolved gasses to produce the desired product.

Water and/or high hydrogen to carbon ratio liquids can be mixed with the hydrocarbon material in the pug chamber to help change the hydrocarbon material to the desired plasticity for extruding and sealing while also enhancing the amount of hydrogen in the final product.

In order to facilitate the addition of additional high hydrogen content fluids, such as natural gas, as the hydrocarbon material enters the heat exchangers, a gas manifold can be attached to the exit of the extrusion auger and entrance to the heat exchanges such that the additional high hydrogen gas and the extruded extrudate enter the heat exchangers together and thus react together as they proceed along the heat exchanger tubes while increasing in temperature in the heat exchanger tubes.

The heating chamber and cooling chamber can operate at pressures other than the ambient pressure external to the heating and cooling chambers since the extruding auger used to extrude the hydrocarbon material into the heating chamber is capable of producing extruder exhaust pressures either below the ambient pressure or pressures well above the ambient pressure, whatever pressure in the heating chamber is desired.

Pressures in the heating chamber and the cooling chamber can be controlled by regulating the release of the remaining gasses in the cooling chamber; or condensing all or almost all of the gasses entering the cooling chamber into liquid.

Figure 1:
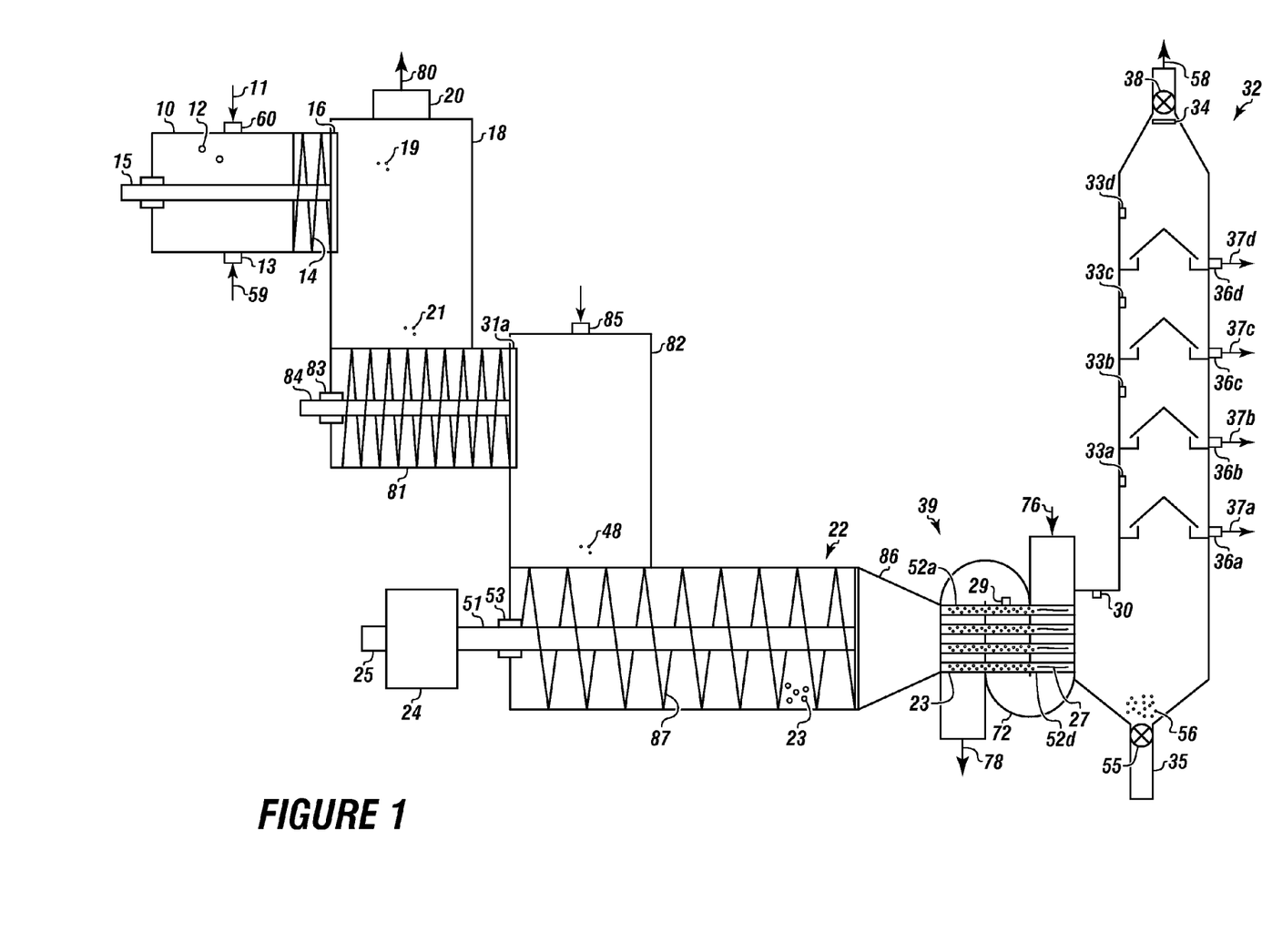
FIG. 1 is an overall diagram of the system with a heat exchanger to produce a liquid fuel from the combination of natural gas and other high hydrogen fluids with coal and other carbonaceous materials and having two chambers prior to the extruder, each chamber having its own drive shaft.

Turning now to the Figures, FIG. 1 is a diagram of the continuous high capacity system with a heat exchanger for converting the combination of carbonaceous material, such as coal, and high hydrogen content fluid, such as natural gas, into gaseous and liquid fuels.

A pug 10 can be used to receive carbonaceous material 11 through a carbonaceous port 60, such as coal, charcoal, and graphite, or combinations thereof.

The pug 10 can be a chamber for blending the finely divided carbonaceous based material with a plasticizing agent. The finely divided carbonaceous based material can be introduced at the opposite end from a sealing auger. The plasticizing agent 59 is introduced at the same end as the finely divided carbonaceous based material. The pug can consist of a rotating shaft containing knives that mix the finely divided carbonaceous based material with the plasticizing agent to form a plasticized material and transfers the plasticized material down the chamber to the sealing auger.

In an embodiment, a plasticizing agent 59 can be inserted through a plasticizing agent into input port 13 which is used to plasticize the carbonaceous material in the pug forming a plasticized carbonaceous material 12.

The sealing auger 14 can be located at the end of the pug chamber and at the entrance of a vacuum chamber, which can be driven by the pug shaft 15.

The sealing auger can be an auger which when filled with the plasticized material forms a seal between the pug and the vacuum chamber and transfers the formed plasticized material to the vacuum chamber. The vacuum chamber pressure can be less than 0.5 inches of mercury absolute.

A cutting device 16 can be used to shred the plasticized carbonaceous material 12 into shredded particles 19 to facilitate removal of air from the plasticized material in the vacuum chamber. In one or more embodiments, the cutting device can be a shredder, which can have from 16 blades to 24 blades.

In one or more embodiments, the cutting device can contain a plurality of radial knives connected to the sealing auger drive shaft to cut the material exiting from the sealing auger. In an embodiment, the plurality can have from 4 knives to 50 knives used on the cutting device.

A vacuum chamber 18 can receive the shredded particles 19 of the plasticized carbonaceous material 12 while a vacuum pump 20 connected to the vacuum chamber 18 removes air from the shredded particles 19 of, forming de-aerated particles 21. The vacuum chamber 18 is shown with a vacuum chamber exhaust 80.

The vacuum pump 20 can be a SIHI liquid ring vacuum pump that can pull gas from the shredded particles in the vacuum chamber by creating a vacuum in the vacuum chamber of less than 1 inch of mercury absolute.

A first shredder 31a can be connected between the vacuum chamber 18 and the gas injection chamber 82.

With sufficient time for all the air, or most of the air, to be removed from the plasticized particles the de-aerated particles enter the gas injection chamber sealing auger 81 located at the exit of the vacuum chamber and entrance of the gas injection chamber 82.

The gas injection chamber sealing auger 81 agglomerates the de-aerated plasticized carbonaceous material and forms a seal between the vacuum chamber and the gas injection chamber. The gas injection sealing auger can have its own drive shaft 84 and shaft seal 83.

Gas, such as methane, is injected into the gas injection chamber 82 through a gas injection port 85 in order to impregnate the de-aerated plasticized carbonaceous material with the high hydrogen content gas.

In order to facilitate the entrainment of gas into the de-aerated material a shedder can be positioned at the exit of the gas injection chamber sealing auger to shred the de-aerated plasticized carbonaceous material into particles.

With sufficient time for the de-aerated carbonaceous particles to be impregnated with the high hydrogen gas the gas impregnated carbonaceous particles enter the extruder forming gas impregnated particles 48.

An extruder 22 which can be a single or multi-screw extruder can be used to receive the de-aerated particles 21.

The extruder 22 can be used to agglomerate and pressurize the gas impregnated particles 48 to a pressure from ambient pressure to 500 psi thus forming an air-free and gas impregnated extrudate 23. When the extruder is sufficiently filled with the plasticized extrudate it and the extrudate form a gas tight seal between the gas injection chamber and the heating chamber.

The extruder 22 can have an extruder auger 87, an extruder shaft 51 and an extruder shaft seal 53. The extruder 22 can be run by an extruder motor 24 that has an extruder motor current sensor 25 for controlling the extruder motor 24. The extruder motor current sensor 25 can be used to monitor both: plasticity of the gas impregnated plasticized material in the extruder, and pressure on the gas impregnated plasticized material in the extruder.

In one or more embodiments, the extrudate 23 travels through the compression cap 86 to the heat exchanger 39. The heat exchanger can receive the shredded extrudate 26 or the extrudate 23. The heat exchanger can rapidly heat the hydrocarbon material to a selected temperature from about 500 degrees Fahrenheit to about 1200 degrees Fahrenheit in order to form hydrocarbon gasses 27.

In other embodiments, the heat exchanger can be replaced with a heating chamber.

External heat can be applied to the heat exchanger 39 and heat the exchanger tubes 52a, 52b, 52c, and 52d by a heat exchanger duct 72 surrounding the heat exchanger tubes, the duct supplying high temperature gasses or liquids to the exterior of the heat exchanger tubes. The entrance of the heat exchanger duct for the high temperature gasses or liquids is a first duct port 76 and the second duct port 78 exhausts the high temperature gasses or fluids from the heat exchanger duct 72.

At least one pressure sensor 30 can be used for detecting pressure in the heating area enabling the pressure dependent process to be controlled.

At least one temperature sensor 29 can be used for detecting temperature in the heating area enabling the temperature dependent process to be controlled.

A cooling chamber 32 can receive the gasses 27 and can provide controlled pressure release and controlled temperature cooling on the gasses 27 which have been evolved.

The cooling chamber can liquefy sequentially at least 50 percent of the gasses 27 which have been evolved, forming separated liquids 37a, 37b, 37c, and 37d that can be emitted through liquid removal ports 36a, 36b, 36c, and 36d that can be positioned sequentially in the cooling chamber.

A plurality of temperature sensors 33a, 33b, 33c, and 33d can be disposed in the cooling chamber 32 with at least one sensor adjacent to the liquid removal ports 36a, 36b, 36c, and 36d.

Additionally, a cooling chamber pressure sensor 34 can be in the cooling chamber 32 which can be used with a control device to prevent pressures from exceeding or dropping below preset limits.

A pressure sealing controllable particle port 35 with valve 55 can be located between the exit of the heat exchanger 39 and the entrance to the cooling chamber 32 and used for removing particles and liquids 56 from the process that are not converted to one of the gasses created during the heating process in the heating chamber.

In one or more embodiments, the extrudate 23 can be a continuous gas impregnated plasticized mass.

In one or more embodiments, the liquid removal ports 36a, 36b, 36c, and 36d can each have a preset temperature.

Additionally, a pressure regulator valve 38 can be used for controlling pressure in the cooling chamber 32 and for removing unconverted gas 58 as a fuel which can be used as a fuel source for a heat exchanger 39, a heating chamber, or other uses.

In embodiments the system can continuously produce liquid and gaseous fuel from up to 100 tons an hour of the combination of carbonaceous material and high hydrogen content fluid.

In embodiments, the carbonaceous material can be coal, carbon, charcoal, graphite, and other carbonaceous materials.

In embodiments, the finely divided carbonaceous materials introduced into the pug chamber should have diameters of less than 200 microns in order to facilitate the rapid conversion of the solid carbonaceous material and high hydrogen content fluid combination into gasses in the heating chamber.

In embodiments, the vacuum pump removes over 95 percent of the air from the particles of plasticized material in the vacuum chamber.

In embodiments, wherein the plasticizing agent is used, the plasticizing agent can be glycerol, oil, oil based liquid, water, water based liquid, detergents, or combinations thereof.

Figure 2:
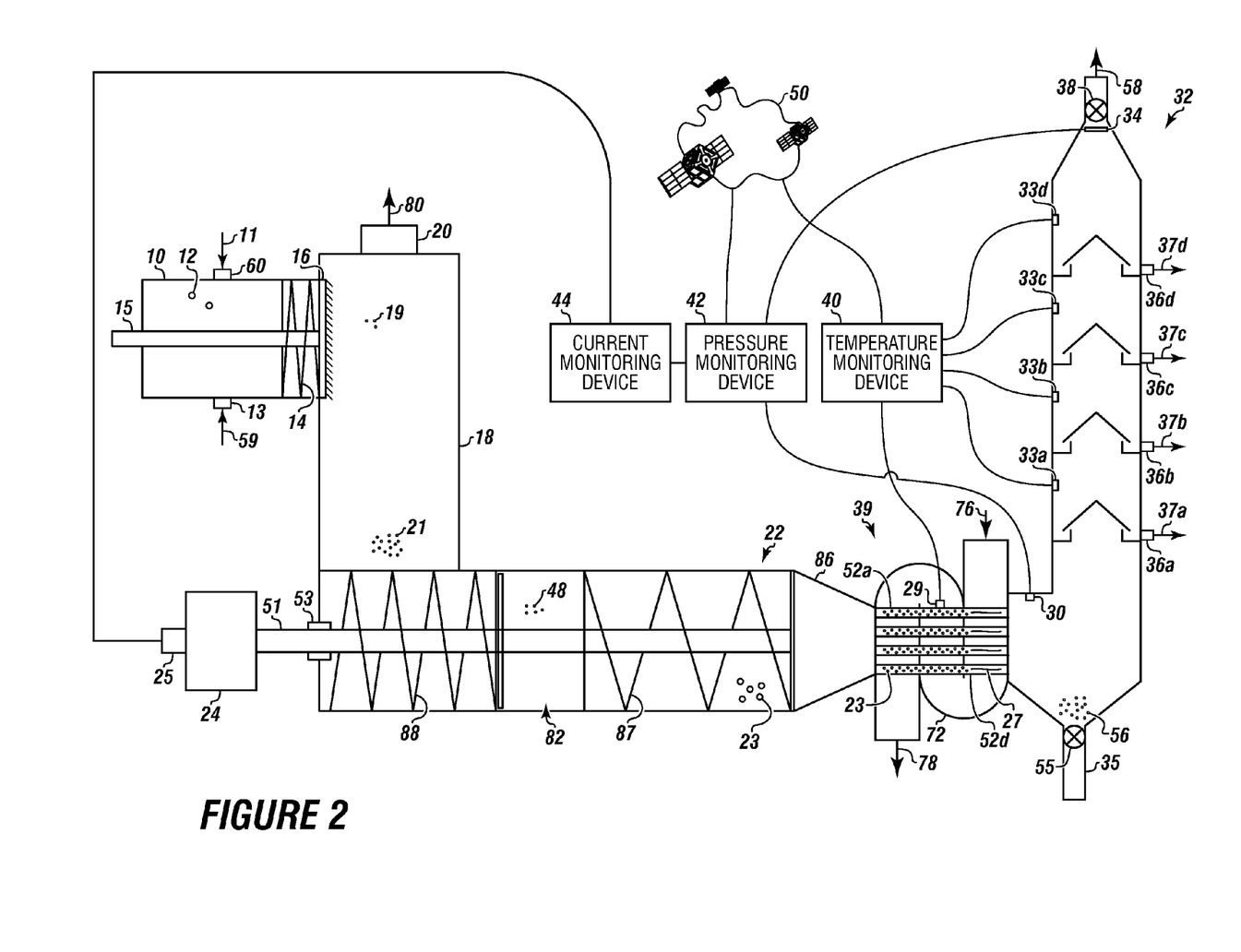
FIG. 2 is an overall diagram of the system with a heat exchanger to produce a liquid fuel from the combination or natural gas and other high hydrogen fluids with coal and other carbonaceous materials with a different embodiment than shown in FIG. 1 and having two chambers prior to the extruder with the second chamber being on the same drive shaft as the extruder.

FIG. 2 is an overall diagram of the system with the second chamber and the gas injection chamber located in-line with the extruder such that the gas injection chamber sealing auger and the gas injection sealing auger shedder are both driven by the same shaft that drives the auger.

In FIG. 2 the function of the pug, vacuum chamber sealing auger and its associated shredder, the vacuum chamber, the gas injection chamber sealing auger and its associated shredder, the gas injection chamber, the extrusion auger and extruder, the heat exchanger and the cooling chamber and its associated valves are the same as in FIG. 1. The location of the vacuum chamber and gas injection chamber are rearranged from FIG. 1 to reduce the number of drive shafts required to carry out the necessary functions of the system.

In one or more embodiments, a temperature monitoring device 40 can be used for monitoring the plurality of temperature sensors 33a, 33b, 33, and 33d. In an embodiment, the temperature monitoring device 40 can be a laptop, a computer, or another monitoring system. In embodiments, the temperature monitoring device 40 can be connected to a network 50, which can allow remote monitoring of the process.

In one or more embodiments, a pressure monitoring device 42 can be used for monitoring the heating chamber pressure sensor 30, the cooling chamber pressure sensor 34, and combinations thereof. In embodiments, the pressure monitoring device 42 can communicate with the network 50 for monitoring from a remote location, and the pressure monitoring device can be a computer, a laptop, a cellular or mobile phone, a tablet, a meter, or similar device.

In embodiments, the network can be a cellular network, the internet, a local area network, a wide area network, separate meters, a similar network, or combinations thereof.

In embodiments, a current monitoring device 44 can be used for monitoring the extruder motor 24. The current monitoring device 44 can communicate using the network 50 or a separate meter.

Figure 3:
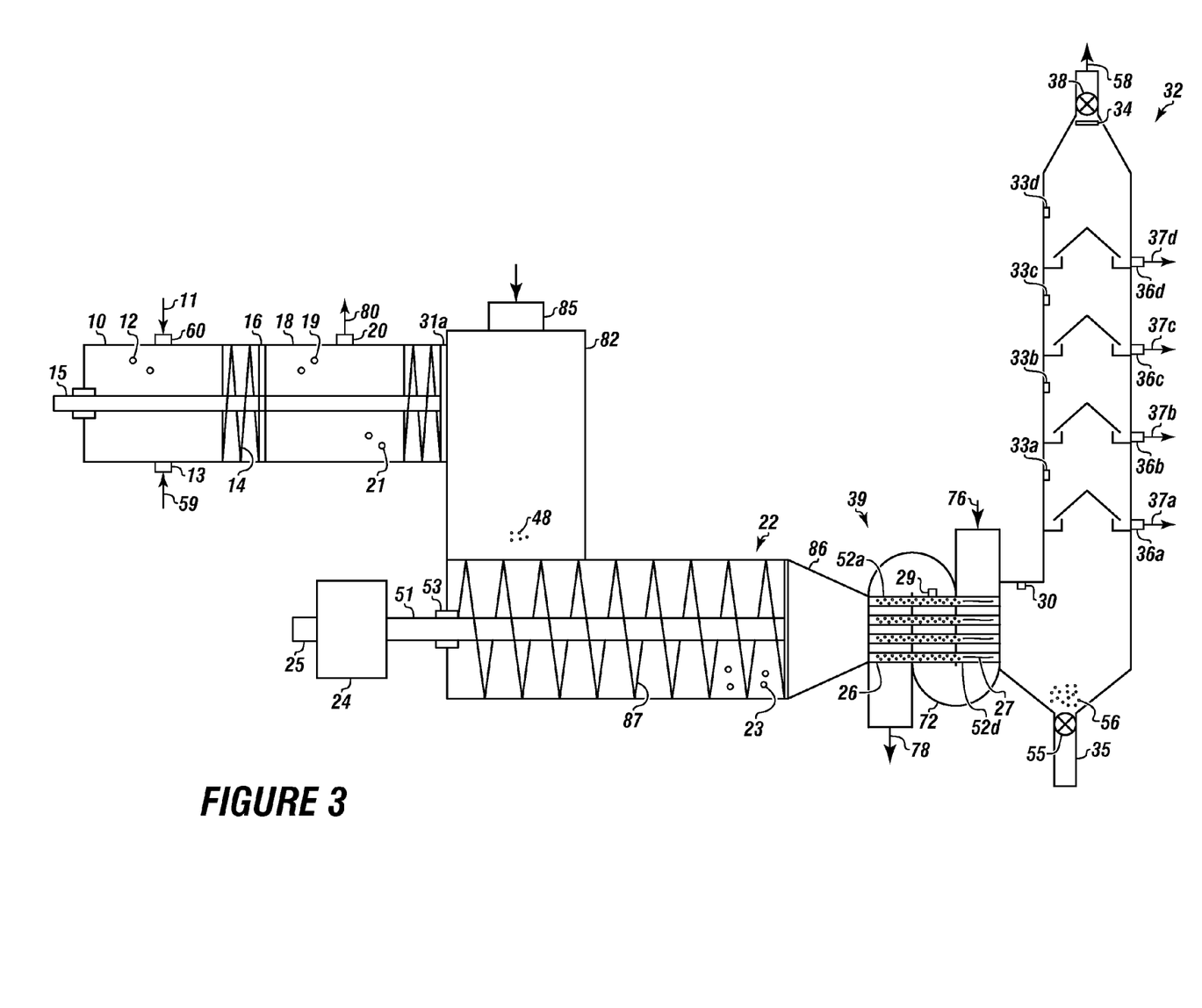
FIG. 3 is an overall diagram of the system with a heat exchanger to produce a liquid fuel from the combination or natural gas and other high hydrogen fluids with coal and other carbonaceous materials with a different embodiment than shown in FIG. 1 and FIG. 2 and having two chambers prior to the extruder with the second chamber being on the same drive shaft as the first chamber.

FIG. 3 is an overall diagram of the system with the pug, the first chamber, the vacuum chamber, and the second chamber, the gas injection chamber, all located in-line with each other and driven by the same drive shaft.

In FIG. 3 the functions of the components are the same as in FIG. 1 and FIG. 2. The location of the gas injection chamber in-line with the vacuum chamber, with their sealing augers driven by the same shaft reduces the number of drive shafts necessary to carry out the system functions.

Figure 4:
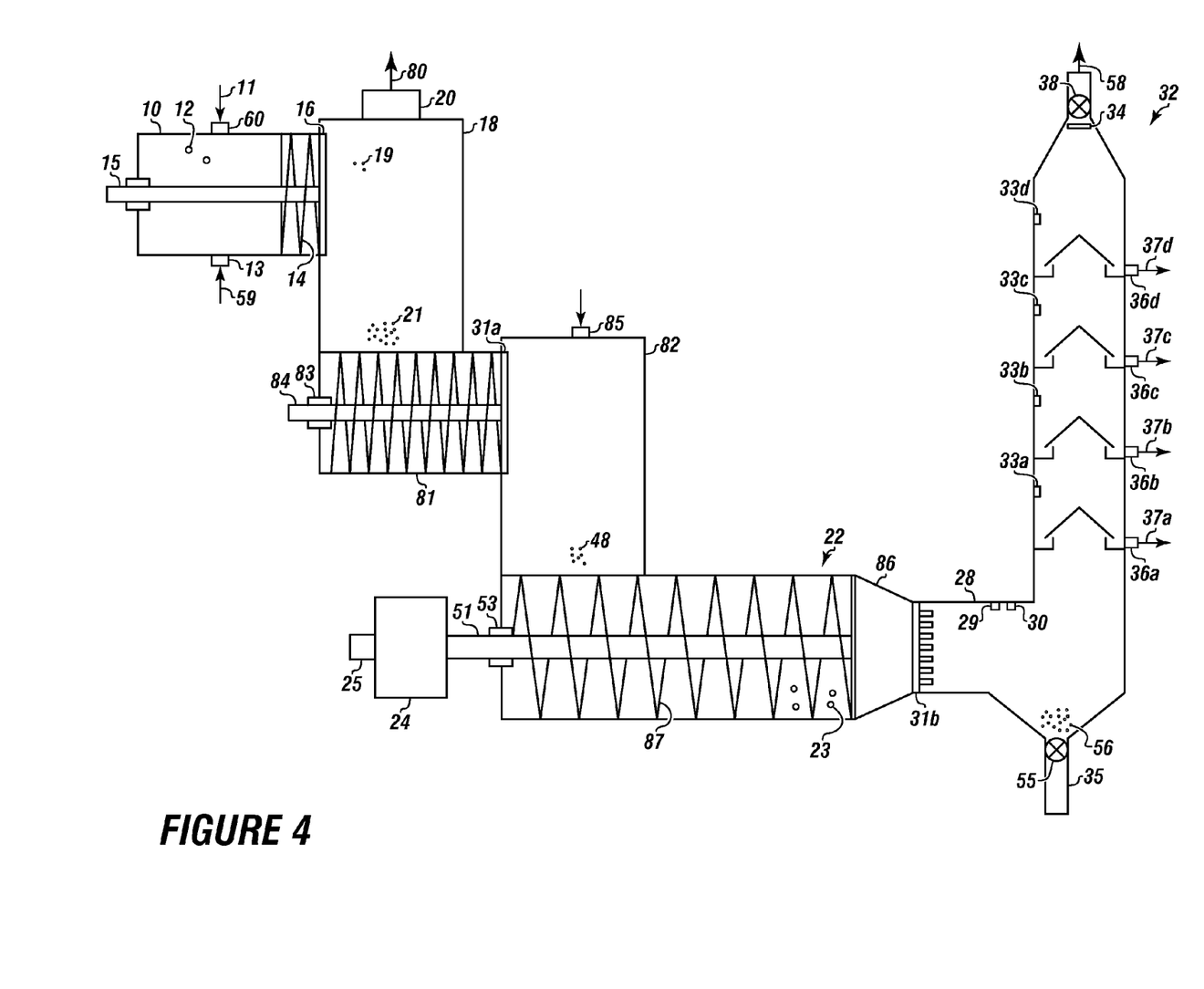
FIG. 4 is an overall diagram of the system similar to FIG. 1, but with a heating chamber in place of a heat exchanger for transforming the gas-plasticized material mix into gasses.

FIG. 4 is an overall diagram of the system without a heat exchanger to produce liquid and gaseous fuels from a combination of carbonaceous materials and high hydrogen fluids.

The embodiment illustrated in FIG. 4 is similar to the embodiment illustrated in FIG. 1. Therefore, in the interest of brevity, those similar elements described in FIG. 1 will not be described again with reference to FIG. 4.

FIG. 4 shows the system with a heating chamber 28 instead of the heat exchanger.

In this Figure, two shredders 31a and 31b can be usable in the system.

The first shredder 31a can be connected between the vacuum chamber 18 and the gas injection chamber 82. The second shredder 31b can be connected between the extruder 22 and the heating chamber 28 or between the extruder 22 and the heat exchanger for shredding the extrudate 23.

Figure 5:
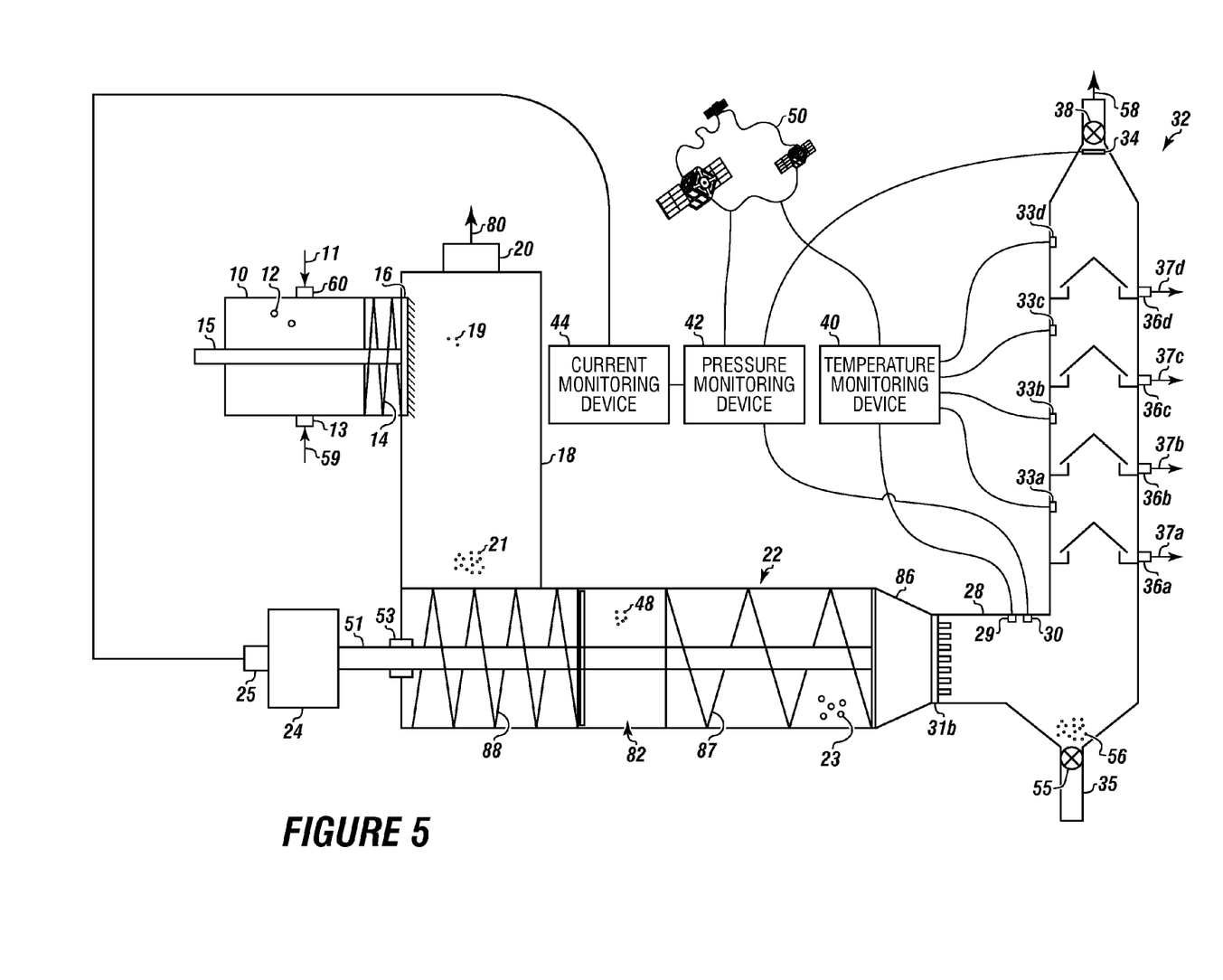
FIG. 5 is an overall diagram of the system similar to FIG. 2, but with a heating chamber in place of a heat exchanger for transforming the gas-plasticized material mix into gasses.

The embodiment illustrated in FIG. 5 is similar to the embodiment illustrated in FIG. 2. Therefore, in the interest of brevity, those similar elements described in FIG. 2 will not be described again with reference to FIG. 5.

FIG. 5 shows the system with a heating chamber 28 instead of the heat exchanger.

Figure 6:
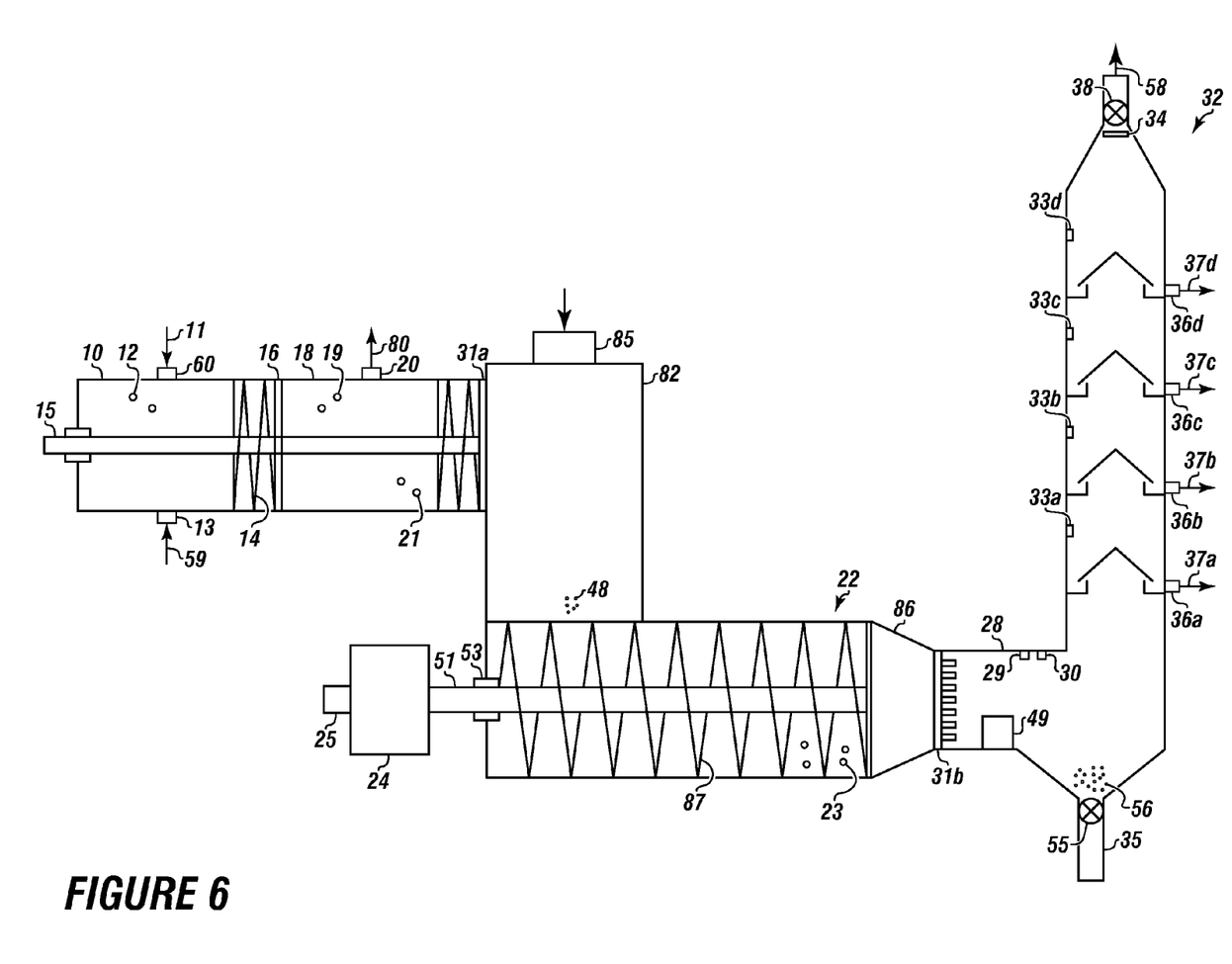
FIG. 6 is an overall diagram of the system similar to FIG. 3, but with a heating chamber in place of a heat exchanger for transforming the gas-plasticized material mix into gasses.

The embodiment illustrated in FIG. 6 is similar to the embodiment illustrated in FIG. 3. Therefore, in the interest of brevity, those similar elements described in FIG. 3 will not be described again with reference to FIG. 6.

FIG. 6 further shows a heater 49 usable in the system.

In the system, the extrudate 23 or shredded extrudate 26 can be directly and rapidly heated to the required process temperature by injecting high temperature steam or other high temperature fluids 81 directly into the heating chamber 28. The injection of the high temperature steam directly into the heating chamber 28 can cause some of the carbon in the high hydrogen fluid-carbonaceous material mix to be oxidized by the oxygen in the steam thus reducing the amount of carbon available to be transformed into fuel but providing additional hydrogen into the process.

In the heating chamber 28 the extrudate 23 and/or the shredded extrudate 26 can be heated directly and rapidly by injecting into the heating chamber an oxidizing agent 61 which can react with some of the carbon and/or hydrogen in the extrudate 23, shredded extrudate 26, or combinations thereof, causing rapid heating of the extrudate and/or shredded extrudate. This reaction with some of the carbon and/or hydrogen reduces the amount of carbon and/or hydrogen available to be converted to liquid and/or gaseous fuel.

In the system, the extrudate 23 and/or shredded extrudate 26 can be rapidly heated by placing a heater inside the heating chamber 28. The heater can be an electric heater, a gas heater, or some other type of similar heater.

In the system, a high hydrogen content gas or liquid can be injected directly into the heating chamber 28 in order to further increase the hydrogen content of the extrudate 23 and/or shredded extrudate 26 to obtain the necessary carbon and hydrogen mix for the fuel desired.

In this Figure, two shredders 31a and 31b can be usable in the system.

The first shredder 31a can be connected between the vacuum chamber 18 and the gas injection chamber 82. The second shredder 31b can be connected between the extruder 22 and the heating chamber 28 or between the extruder 22 and the heat exchanger 39 for shredding the extrudate 23.

Figure 7:
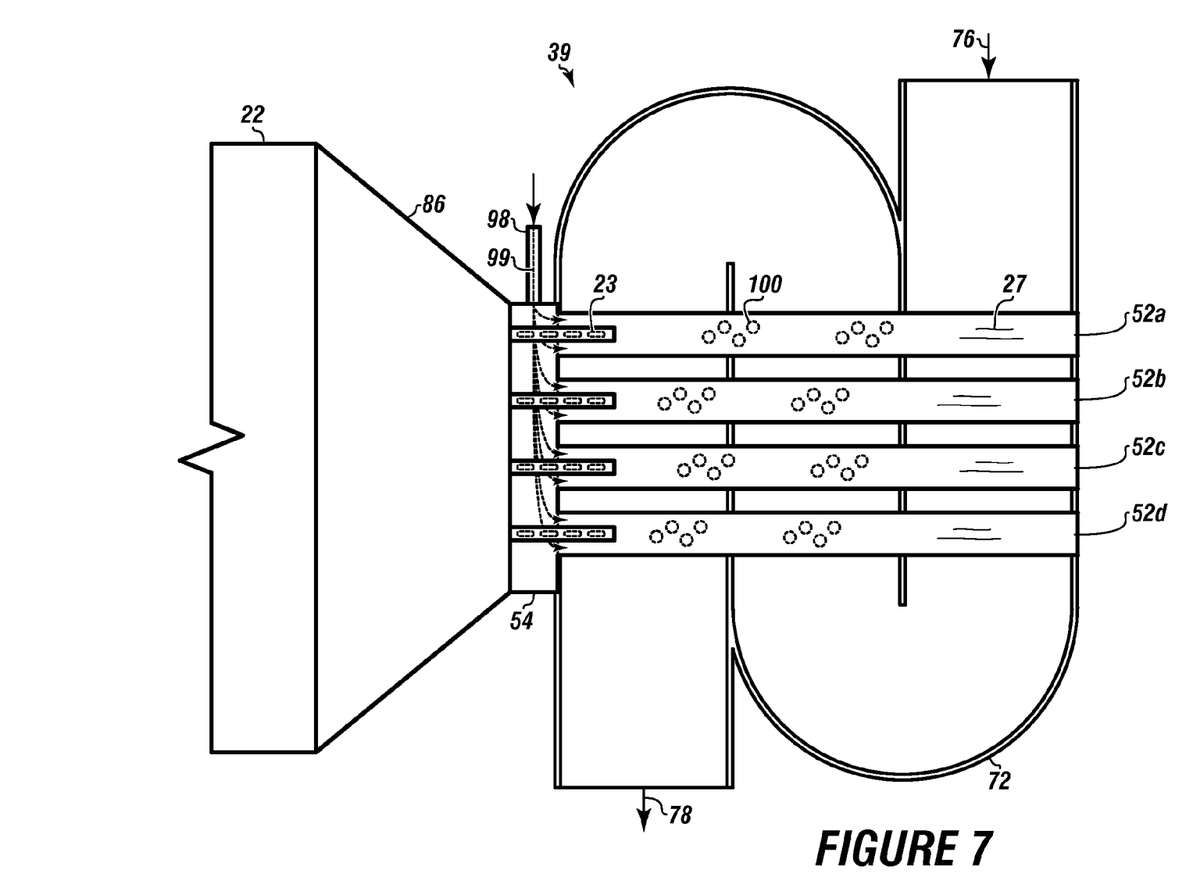
FIG. 7 depicts a fluid manifold for injecting a high hydrogen fluid in the process and also shows greater detail of the heat exchanger contained in FIG. 1, FIG. 2, and FIG. 3.

FIG. 7 depicts a manifold for injecting high hydrogen content gas or liquid into the process and contains greater detail of the heat exchanger of FIGS. 1, 2 and 3.

The heat exchanger 39 can be formed from a plurality of heat exchanger tubes 52a, 52b, 52c, and 52d.

The extrudate 23 and/or shredded extrudate 26 can flow from the extruder 22 though the heat exchanger tubers 52a-52d forming gasses 27.

In embodiments, the heat exchanger 39 can be a thin walled tube style heat exchanger allowing for rapid transfer of external heat to the material in the heating chamber.

In one or more embodiments, manifold 54 can be positioned between the extruder 22 and the heat exchanger 39 or in other embodiments, the heating chamber 28, for allowing additional high hydrogen content gas or liquid 99 to flow into the extrudate 23 as the extrudate enters the heating chamber or the heat exchanger tubes thus forming a gas extrudate mix containing additional gas 100.

In one or more embodiments, the manifold can be a natural gas manifold. In other embodiments, the manifold can be a high hydrogen content fluid manifold.

The heat exchanger 39 or in other embodiments, the heating chamber 28, can have a gas or liquid port 98 for flowing high hydrogen content gas or liquid 99 through the gas or liquid port 98 and into the manifold 54.

In one or more embodiments, usable extruders can be a singled shaft or multiple shaft extruder. The extruder motor current sensor can be an ammeter.

Below is an example of the system:

Coal at the rate of 25 tons per hour, reduced in size to 50 micron minus, is transported to a J C Steele 75AD combination pug sealer and extruder into the pug sealer mixer. The finely ground coal is transported from a storage silo, the feed from the storage silo regulated at a constant rate via two feed screws installed at the bottom of the silo, thence via an enclosed screw conveyor to the pug mixer. A plasticizing agent, in this case glycerol obtained as a byproduct from conversion of waste cooking oil to bio-diesel, is added at the input of the pug mixer at a rate sufficient to control the energy input to the extrusion process. In the case of glycerol, the initial rate is 60 pounds per minute which is seven percent of the finely ground coal weight rate. The rate of the glycerol addition is subsequently adjusted to control the amperage of the extruder motor, to be discussed later. The combination coal and glycerol is mixed to a uniform consistency in the pug mixer and is transported towards the pug sealer and vacuum chamber by the mixing knives, the angle of the knives being set to control the rate of transport along the length of the pug mixer. At the entrance to the pug sealer the combination coal and glycerol is now a plasticized extrudate.

The extrudate next enters the pug sealer, which is on the same shaft as the mixing knives, the pug sealer agglomerating the extrudate and providing a seal between ambient pressure in the pug and the vacuum in the vacuum chamber, the vacuum chamber being an integral part of the J C Steele combination pug sealer and extruder machine. Upon exiting the pug sealer the extrudate passes through shredding knives which are also on the same shaft as the mixing knives. The shredded extrudate drops from the shredding knives to the bottom of the vacuum chamber into the rearward extension of the second chamber auger flights which extend into the vacuum chamber. Upon entering the vacuum chamber the shredded extrudate is subjected to a vacuum of 25 inches of mercury below ambient when the process is located at 3,750 feet above sea level. The shredded extrudate is subjected to this vacuum for approximately twelve seconds prior to being agglomerated in the enclosed portion of the second chamber sealing auger. The vacuum in the vacuum chamber is provided by a SIHI LPH 55312 liquid ring vacuum pump driven by a 15 horse power, four pole, 1800 RPM motor, the working liquid being transformer oil. The transformer oil is cooled, while in operation, by water in an oil/water heat exchanger, the water is subsequently being cooled in an water/air radiator. The SIHI liquid ring vacuum pump maintains a vacuum of 95% below ambient pressure. The shredded extrudate subjected to this vacuum has approximately 95% of the air contained in the extrudate upon entering the vacuum chamber removed prior to entering the enclosed portion of the second chamber sealing auger. The second chamber is a modification from the standard J C Steel 75AD and consists of a sealed chamber with a sealing auger between the vacuum chamber and this chamber hereafter referred to as the natural gas chamber and this sealing auger hereafter referred to as the natural gas sealer. The natural gas sealer reagglomerates the extrudate thus forming a seal between the vacuum chamber and the natural gas chamber. The natural gas sealer auger is on the same shaft as the main extruder. Upon exiting the natural gas sealer flights the extrudate passes through a second set of shredding knives, also attached to the main extruder shaft, which shred the extrudate into small particles. Natural gas is pumped into the second chamber at a pressure sufficient to cause an impregnation of the shredded extrudate with natural gas at approximately 0.35 percent by weight of the coal extrudate mass.

This natural gas impregnation serves two purposes which are: the addition of a portion of the natural gas needed to form a liquid in the coal/natural gas transformation to a liquid fuel and sufficient natural gas impregnated into the coal extrudate in the natural gas chamber to cause a very rapid expansion of the natural gas impregnated coal upon entering the heat exchangers from the extruder. Upon the extrudate entering the enclosed portion of the extruder, the extrudate is once again agglomerated and pressurized in the extruder forming a seal between the natural gas chamber and the extruder exit. The desired pressure is controlled by the amount of plasticizing agent, in this case glycerol, added to the coal fines in the pug mixer, the amount of energy exerted upon the extrudate by the extruder, and the size of the cap attached to the extruder exit. The exit cap is set at 5.2 inches inside diameter. The extruder is powered by a 200 horse power, 8 pole, 900 rpm, Baldor totally enclosed, fan cooled, 480 volt, three phase motor with roller bearings on its output shaft. The motor being connected to the extruder shaft via speed reducing belts, belt sheaves, and an air operated clutch mechanism, the input sheave and the clutch being an integral part of the J C Steele 75AD. The amperage input to the motor is monitored by a Yokogawa 800 Plus Universal Digital Meter ammeter which, besides an amperage readout, has two amperage dependent relays. In this case, the extruded extrudate/natural gas combination being subject to a desired pressure of 450 PSI Gauge, the desired current is approximately 180 amperes. The first amperage relay is set at 200 amperes and is used to turn on a warning light to warn the operator of excessive current to the extruder motor. The second amperage relay is set to 230 amperes and is used to automatically disengage the extruder motor input clutch in order to prevent damage to the extruder. The extruder-pug operator monitors the amperage as shown on the Yokogawa ammeter and manually adjusts the amount of glycerol added to the coal fines in the pug mixer to obtain the desired amperage input to the extruder motor and thus the pressure of the extrudate in the extruder. To lower the amperage additional glycerol is added and to raise the amperage the rate of glycerol is reduced.

Upon exiting the extruder cap the extrudate enters a heat exchanger where the natural gas impregnated extrudate very rapidly expands and the temperature of the combination of the natural gas and now finely divided coal and are rapidly heated to 1,100 degrees Fahrenheit in order to change the combination of the coal and natural gas completely into a gas. The heat exchanger consists of 20 round Type 310 stainless steel tubes which have an interior diameter of two inches and a wall thickness of 0.050 inches. The tubes are ten feet long. At the entrance to each heat exchanger tube is located a natural gas orifice, subject orifice exhaust pointing into each tube, which injects additional natural gas into the now expanded natural gas impregnated extrudate in sufficient volume to obtain a mass ratio of 10 parts of natural gas to 85 parts of coal taking into account the methane already existing in the coal prior to entering into this process. The tubes are arranged with four tubes in each layer arranged in the same plane horizontally with five layers. The tubes in each horizontal layer are separated by one inch and the layers are separated by two inches. The tube combination is surrounded by a heating manifold, the manifold being one inch above and one inch below the heat exchanger tube combination with the entrance end of the tubes and the exit end of the tubes isolated from the heating manifold. The heating manifold has an internal entrance of 2.85 square feet, 20 inches wide and 20.5 inches high, and the entrance covering all 20 tubes of the final 20 inches of the heat exchanger tubes. The manifold goes across the 20 tubes and then makes a 180 degree turn back towards the entrance now covering the fifth 20 inches of the heat exchanger tubes. Upon crossing all of the fifth 20 inches of the tubes the heating manifold makes another 180 degree turn away from the heating chamber entrance and crosses the forth 20 inches of the heat exchanger tubes. Upon crossing all of the forth inches of the heat exchanger tubes the heating manifold makes another 180 degree turn back in the direction of the heating manifold entrance and so on, until the sixth pass of the manifold crosses the first 20 inches of the heat exchanger tubes and finally exhausting to the atmosphere.

The heating manifold is heated internally by a group of six burners located so as to exhaust into the heating manifold entrance, each capable of providing up to seven million BTUs of energy output per hour to the entrance of the heating manifold. The burners are the pressure air type burner, with the air requirement to each burner of 1.3 pounds air per second at an input pressure of 22 inches of water static pressure. The air is provided by a direct drive centrifugal blower driven by a two pole, 3600 RPM, three phase, totally enclosed fan cooled, 480 volt, 50 horse power motor capable of providing 7,000 cubic feet air per minute at 22 inches of water static pressure. The energy input to the burners is initially provided by natural gas at 683 cubic feet per minute at a sea level standard 1025 BTU per cubic foot. Once the process reaches a steady state operation the non-liquefied gases exhausted from the top of cooling tower are sufficient to provide the necessary energy to power the manifold heating burners.

Once the mostly gasified extrudate exits the heat exchanger tubes the gas and any extrudate which has not been transformed into a gas, enters a chamber ten feet long and six feet in diameter where any extrudate not transformed into a gas falls to the bottom of this chamber and is removed from the chamber by a rotating sealing lock, manufactured by Wm. Meyer & Sons, Inc., which is able to remove solids and liquids from this chamber without allowing low pressure gases to escape. This chamber is made of 0.10 thick mild steel and is insulated to prevent the gases generated in the heat exchanger tubes from decreasing in temperature and thus condensing some of those gases. This chamber contains four K Type thermocouples arranged near the exit of the heat exchanger tubes at an angle of 90 degrees around the central axis of the heat exchanger tubes at a radius of six inches and one other K Type thermocouple at the central axis of the heat exchanger tubes, also near the exit of the heat exchanger tubes. These thermocouples are connected to digital temperature controllers in order for the heat exchanger monitor to view the temperature of the gases and manually control the heat input to the heating manifold surrounding the heat exchanger tubes. This chamber also contains a pressure tap connected to a pressure gauge in order for the operator to be able to monitor the pressure at the exit of the heat exchanger tubes, the desired pressure being four PSI Gauge. The heat exchanger generated gases next enter the cooling tower where the gases are condensed into liquids. This tower consists of a vertical 10 foot diameter cylinder 50 feet high made of 0.125 inch thick mild steel surrounded by a 0.10 inch thick mild steel cylinder of 10 feet six inches diameter which transports the cooling water around the condensing tower.

While the intent of this invention is to transform solid coal and gaseous natural gas into liquid fuels and not necessarily to separate those liquids into liquids of different boiling temperatures, the introduction of trays at different heights and temperatures is included in this manifestation since it facilitates the condensation of the gases and is also an economical addition to the manifestation in order to accomplish some degree of that separation. The tower includes, in this manifestation, nine circumferential trays with pyramidal caps above each one, a gas lock at the bottom of the tower, an automatic pressure regulator at the top and two emergency pressure blow off valves at the top. The tower has a rotating vane gas lock, manufactured by Wm. Meyers & Sons, Inc., at the bottom to carry away any condensed liquids which accumulate at the bottom without releasing any gases contained in the tower. The circumferential trays have an outer diameter connected and sealed to the inner diameter of the condensing tower and an inner diameter of five feet with a lip on the inner diameter of four inches above the tray bottom. The pyramidal caps have an outer diameter of six feet and which outer diameter extends 1.50 inches below the top of the tray outer diameter lip top. The trays are five feet apart in elevation starting at five feet above the bottom of the condensing tower. Each tray has an outlet located two inches above the bottom of the tray, the outlet is provided with a valve which allows liquids, but not gases to exit through the condensing tower and the outer cooling water jacket. The automatic pressure regulator at the top of the tower is six inches in diameter with a conical vertically moving plug weighing 57 pounds in order to regulate the pressure at the top of the tower at two PSI Gauge. The outlet of this regulator is an eight inch diameter pipe with a wall thickness of 0.125 inches, the pipe to regulator to condensing tower forming a sealed connection so as not to allow any gases to escape to the surrounding atmosphere. The pipe is reduced in size to six inches diameter and is extended down to the heating manifold burners in order to transport the non-condensed gases to the heating manifold burners for use to supply the energy required by these burners. Also located at the top of the condensing tower are two emergency pressure relief valves, each valve consisting of a 12 inch diameter flat hole in the top of the condensing tower sealed with a 13 inch diameter gasketed plate using 0.25 inch thick buna-n rubber as the gasket material. Each of these plates is weighted with 450 pounds of lead and connected on one side with a two foot arm which is hinged at its outer most extremity to allow the sealing plate to rise up and release any pressure within the condensing tower which exceeds four PSI Gauge.

In order to cool the condensing tower, the tower is surrounded with the water cylinder. Water is pumped into the space between the condensing tower and the cooling water cylinder tangentially at the top of the condensing tower/cooling water cylinder at a rate of 1,000 gallons per minute at a velocity of 15 feet per second through a round nozzle of five inches in diameter. This provides for a spiraling flow of water around the condensing tower gradually descending down the condensing tower, allowing a three minute residence of the cooling water from the time of entrance until the time of exit. The rate of exit from the cooling cylinder is manually regulated by adjusting a valve on the exit water point by watching the pressure on the output of the cooling water pump and controlling it to a pressure of 23 PSI Gauge. The pump to pump the cooling water is a Gould Centrifugal Water Pump-DUGL 15 F-30 powered by a 30 horse power, 480 volt, three phase, two pole, 3600 rpm motor located in the same horizontal plane as the base of the condensing tower. After the exit of the cooling water from the cooling water cylinder the water is transported to a traditional cooling tower in order to cool the water to a maximum of 100 degrees Fahrenheit prior to being recycled back to the cooling cylinder pump.

Thermocouples of the J Type are located at each of the trays in the condensing tower in order to monitor the temperatures of the liquids at each of the points in the condensing tower. J Type thermocouples are also located at the exit of the condensing tower and the cooling water entrance to and exit from the cooling cylinder. These thermocouples are connected to digital temperature controllers in order for the operator to monitor the condensing process.

While these embodiments have been described with emphasis on the embodiments, it should be understood that within the scope of the appended claims, the embodiments might be practiced other than as specifically described herein.

What is claimed is:

1. A continuous high capacity system for converting a combination of carbonaceous materials and high hydrogen content fluids into liquid and gaseous fuels, comprising:
   a. a pug for receiving less than 200 micron diameter particulate coal and carbonaceous materials, or combinations thereof, and blending the less than 200 micron diameter particulate with a plasticizing agent to form a plasticized material;
   b. a sealing auger in communication with the pug for receiving and agglomerating the plasticized material, wherein the agglomerated material in combination with the sealing auger forms a seal with the pug;
   c. a cutting device shreds the plasticized and agglomerated material into shredded particles;
   d. a vacuum chamber for receiving the shredded particles, wherein a vacuum pump connected to the vacuum chamber removes air from the shredded particles, forming de-aerated particles, and wherein the vacuum chamber is sealed from the pug and ambient air using the sealing auger;
   e. a sealing auger in communication with the vacuum chamber for receiving and agglomerating the de-aerated plasticized particles, wherein the agglomerated material in combination with the gas injection chamber sealing auger forms a seal with the vacuum chamber;
   f. a cutting device shreds the plasticized de-aerated and agglomerated material into shredded particles;
   g. a gas injection chamber for receiving the shredded de-aerated particles, wherein high hydrogen content gas is injected into the gas injection chamber impregnating the shredded de-aerated particles with high hydrogen content gas;
   h. an extruder for receiving the high hydrogen content gas impregnated particles and pressurizing the gas impregnated carbonaceous particles to a pressure from below ambient pressure to 500 psi, and agglomerating the plasticized material into an extrudate, which can be a continuous plasticized mass, wherein the extrudate in combination with the extruder forms a seal from the gas injection chamber;
   i. a heating chamber for receiving the extrudate and rapidly heating the extrudate to a temperature from 500 degrees Fahrenheit to 1200 degrees Fahrenheit to evolve at least one gas;
   j. a high hydrogen content fluid manifold positioned between the extruder and the heating chamber allowing additional high hydrogen content fluid to flow into the extrudate as the extrudate flows in the heating chamber;

k. a heating chamber pressure sensor for detecting pressure in the heating chamber;
l. at least one heating chamber temperature sensor for detecting temperature in the heating chamber;
m. a cooling chamber providing controlled pressure and controlled temperature cooling of the at least one gas which has been evolved, wherein the cooling chamber liquefies sequentially at least 50 percent of the at least one gas which has been evolved, forming at least one separated liquid;
n. at least one temperature sensor in the cooling chamber;
o. a pressure sensor in the cooling chamber;
p. a pressure sealing controllable particle port with a valve for removing particles and liquids from the cooling chamber that are not converted to gas in the heating chamber;
q. at least one liquid removal port, wherein each liquid removal port removes a liquid at a preset temperature and pressure as the gas is cooled;
r. a pressure regulator valve for controlling pressure in the cooling chamber and for removing gas from the cooling chamber;
s. a temperature monitoring device for monitoring at least one cooling chamber temperature sensor and at least one temperature sensor in the heating chamber; and
t. a pressure monitoring device for monitoring the pressure sensor in the heating chamber and the cooling chamber pressure sensor.

2. The system of claim 1, further comprising: inserting a plasticizing agent into the pug through a plasticizing agent inlet port, wherein the plasticizing agent is selected from the group: glycerol, oil, oil based liquid, water, water based liquid, detergent, or combinations thereof.

3. The system of claim 1, wherein the temperature monitoring device and the pressure monitoring device communicate to a network.

4. The system of claim 1, further comprising: transporting high hydrogen content fluid impregnated carbonaceous extrudate or shredded extrudate or combination thereof, through a heat exchanger which consists of a plurality of heat exchanger tubes to supply external heat to the extrudate.

5. The system of claim 4, wherein the heat exchanger is a thin walled tube style heat exchanger allowing for rapid transfer of external heat to the extrudate in the heating chamber.

6. The system of claim 4, wherein the heat exchanger has a heat duct that flows hot gasses or liquids over and around the heat exchanger tubes to supply external heat to the heat exchanger tubes and the extrudate and evolved gasses contained on an interior of the heat exchanger tubes.

7. The system of claim 4, further comprising a high hydrogen content fluid manifold positioned between the extruder and the heating exchanger or the extruder and the heating chamber allowing additional high hydrogen content fluid to flow into the extrudate as the extrudate flows into the heat exchanger or heating chamber.

8. The system of claim 4, further comprising a shredder connected between the extruder and the heat exchanger for shredding the extrudate into a shredded extrudate.

9. The system of claim 1, further comprising a shredder connected between the extruder and the heating chamber for shredding the extrudate into a shredded extrudate.

10. The system of claim 1, wherein the pressure regulator valve for controlling pressure in the cooling chamber can remove gas and recycle the gas as a fuel for the heating chamber, the heat exchanger, and other uses.

11. The system of claim 1, wherein the extruder has an extruder motor and an extruder motor current sensor for monitoring:
   a. plasticity of a gas impregnated plasticized material in the extruder; and
   b. pressure on the gas impregnated plasticized material in the extruder.

12. The system of claim 11, further comprising a current monitoring device for monitoring the extruder motor current sensor.

13. The system of claim 12, wherein the current monitoring device communicates to a network.

* * * * *